US008509705B2

(12) United States Patent
Thomas et al.

(10) Patent No.: US 8,509,705 B2
(45) Date of Patent: Aug. 13, 2013

(54) DIFFERENTIAL CLOSED-LOOP TRANSMISSION FEEDBACK IN WIRELESS COMMUNICATION SYSTEMS

(75) Inventors: Timothy A. Thomas, Palatine, IL (US); Bishwarup Mondal, Oak Park, IL (US); Eugene Visotsky, Buffalo Grove, IL (US); Frederick W. Vook, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 596 days.

(21) Appl. No.: 12/872,085

(22) Filed: Aug. 31, 2010

(65) Prior Publication Data

US 2011/0105051 A1    May 5, 2011

Related U.S. Application Data

(60) Provisional application No. 61/257,124, filed on Nov. 2, 2009.

(51) Int. Cl.
*H04B 1/00*    (2006.01)

(52) U.S. Cl.
USPC ......... 455/69; 455/101; 455/63.1; 455/67.11; 455/522; 370/334; 370/310; 370/349; 375/340; 375/346; 375/347

(58) Field of Classification Search
None
See application file for complete search history.

(56) References Cited

U.S. PATENT DOCUMENTS

| 7,391,827 | B2 * | 6/2008 | Kusume | 375/340 |
| 7,447,270 | B1 * | 11/2008 | Hottinen | 375/267 |
| 2003/0068983 | A1 * | 4/2003 | Kim et al. | 455/69 |
| 2006/0121946 | A1 * | 6/2006 | Walton et al. | 455/561 |
| 2007/0058757 | A1 * | 3/2007 | Kusume | 375/340 |
| 2007/0207730 | A1 * | 9/2007 | Nguyen et al. | 455/39 |
| 2009/0122884 | A1 * | 5/2009 | Vook et al. | 375/260 |
| 2010/0067366 | A1 * | 3/2010 | Nicoli | 370/210 |

FOREIGN PATENT DOCUMENTS

EP    1821445 A1    8/2007

OTHER PUBLICATIONS

Eunmo Kang et al.: "Interpolated linear precoding and space-frequency coding for MIMO-OFDM systems", IEEE 42nd Asilomar Conference on Signals, Systems and Computers, 2008, Oct. 26, 2008, pp. 738-742.

(Continued)

*Primary Examiner* — Zhiyu Lu

(57) ABSTRACT

A method and apparatus for providing channel feedback is provided herein. During operation a covariance matrix at time t (R) is calculated as a function of a received downlink signal. Matrix $C^t$ is also calculated and is based on a previous quantized covariance matrix ($R_q^{t-1}$), the covariance matrix (R) at time t, and a forgetting factor ($\gamma$) that is applied to $R_q^{t-1}$. The $C^t$ is then used to create a DERC feedback message (signal or waveform) and may be transmitted with pilots on a proper feedback channel to a base unit. The base unit receives the feedback ($C^t$) as a DERC waveform on a proper feedback channel. The base unit uses non-coherent or coherent detection to detect the DERC values send by the remote unit and uses the DERC values with a previous quantized covariance matrix estimate, a forgetting factor, and a weighting value to compute a covariance matrix estimate to use for beamforming. The base unit then uses the covariance matrix estimate to determine appropriate channel beamforming weights, and instructs transmit beamforming circuitry to use the appropriate weights.

8 Claims, 6 Drawing Sheets

(56) References Cited

OTHER PUBLICATIONS

Thorsten Suttorp et al.: "Efficient covariance matrix update for variable metric evolution strategies", Machine Learning, Kluwer Academic Publishers-Plenum Publishers, NE, vol. 75, No. 2, Jan. 24, 2009, pp. 167-197.

Angel Lozano: "Long-Term Transmit Beamforming for Wireless Multicasting", IEEE International Conference on Acoustics, Speech and Signal Prcessing [Online], Apr. 15, 2007-Apr. 2, 2007, pp. 417-420.

Patent Cooperation Treaty, International Search Report and Written Opinion of the International Searching Authority for International Application No. PCT/US2010/053489, Mar. 31, 2011, 12 pages.

Li, Guangjie et al.: "Proposed Text of DL MIMO Transmission Scheme Section for the IEEE 802.16m Amendment", IEEE 802.16m-09/0331r2, IEEE 802.16 Broadband Wireless Access Working Group, Jan. 7, 2009, all pages.

Clerckx, Bruno et al.: "Improved Differential Codebooks for IEEE 802.16m Amendment Working Document", IEEE C802.16m-09/1530r2, IEEE 802.16 Broadband Wireless Access Working Group, Samsung Electronics, Jul. 12, 2009, all pages.

Samsung Electronics Co., Ltd: "Text Proposal for Transformation Codebook Refinement and Tracking on Section 15.3.7.2.6.6.3", IEEE C802 15m-09/1713, IEEE 802.16 Broadband Wireless Access Working Group, Aug. 28, 2009, all pages.

Qualcomm Europe: "Multiple Description Coding for Spatial Feedback Payload Reduction", 3GPP TSG-RAN WG1 #56, R1-090866, Feb. 9-13, 2009, Athens Greece, all pages.

Philips: "CSI feedback improvements for LTE-A based on multiple codebooks", 3GPP TSG RAN WG1 Meeting #56bis, Tdoc R1-091288, Seoul, Korea, Mar. 23-27, 2009, all pages.

Qualcomm Europe: "Hierarchical feedback in support of downlink CoMP operation", 3GPP TSG-RAN WG1 #58, R1093110, Aug. 24-28, 2009, Shenzhen, China, all pages.

* cited by examiner

DIFFERENTIAL CLOSED-LOOP TRANSMISSION FEEDBACK IN WIRELESS COMMUNICATION SYSTEMS

FIELD OF THE DISCLOSURE

The present disclosure relates generally to wireless communications and more particularly to closed-loop transmission feedback in wireless communication systems and methods.

BACKGROUND

In wireless communication systems, transmission techniques involving multiple antennas are often categorized as open-loop or closed-loop, depending on the level or degree of channel response information used by the transmission algorithm. Open-loop techniques do not rely on the information of the spatial channel response between the transmitting device and the receiving device. They typically involve either no feedback or the feedback of the long term statistical information that a base unit may use to choose between different open loop techniques. Open-loop techniques include transmit diversity, delay diversity, and space-time coding techniques such as the Alamouti space-time block code.

Closed-loop transmission techniques utilize knowledge of the channel response to weight the information transmitted from multiple antennas. To enable a closed-loop transmit array to operate adaptively, the array must apply the transmit weights derived from the channel response, its statistics or characteristics, or a combination thereof. There are several methodologies for enabling closed-loop transmission. These are discussed in the context of the downlink of a cellular communication system in which a base station (BS) (sometimes referred to as a base unit or access point or node-B or eNode-B) with multiple antennas transmits to a mobile station (MS) (sometimes referred to as a mobile or remote unit or user equipment or UE) having one or more receive antennas and one or more transmit antennas. The MS may not necessarily have the same number of transmit antennas as receive antennas. Exemplary closed-loop methodologies include adaptive transmit beam-forming, closed-loop single-user MIMO, closed-loop multi-user MIMO, and coordinated multi-point transmission (or CoMP). In these examples, the transmitter applies weighting coefficients that are derived according to an optimization algorithm to control characteristics of the transmitted signal energy.

One methodology for enabling closed-loop transmission is codebook index feedback in which both the BS and MS maintain one or more finite codebooks of possible transmit weight vectors or matrices, depending on the number of simultaneous transmit beams being formed. The MS measures the downlink multi-antenna channel response and computes the transmit weight vector or matrix that is best suited to transmit information to itself. Specifically a MS chooses the best transmit weight vector or matrix to optimize the data reception performance when the same transmit weight vector or matrix is used by the BS to transmit data to the MS. An MS may also choose multiple elements (vectors or matrices) from one or more codebooks and combine them to construct a single transmit weight vector or matrix. While choosing multiple elements the goal is to optimize the data reception performance when the transmit weight vector or matrix as constructed from the combination is used by the BS to transmit data to the MS. The MS then transmits the index into the codebook back to the BS, where the index into the codebook is often called a Precoding Matrix Index (PMI). The BS uses the transmit weight vector or matrix corresponding to the index fed back by the MS. The particular codebook that a MS and a BS uses may change from time to time. The BS has the flexibility to change the transmit weight vector or matrix recommended by the MS for transmission. Codebook index feedback can be applied to both frequency division duplex (FDD) and time division duplex (TDD) systems.

Another methodology for enabling closed-loop transmission is direct channel feedback (DCFB), wherein the MS measures the downlink channel response and encodes that channel response as an analog signal to be conveyed on the uplink. The downlink channel response estimates are encoded along with known pilot signals that enable the BS to estimate the analog values of the downlink channel estimates. DCFB can be applied to both FDD and TDD systems.

Another methodology for enabling closed-loop transmission is analog covariance matrix or analog eigenvector feedback. In covariance feedback the MS measures the downlink channel response, computes a covariance matrix for the band of interest, and then feeds back the values of the covariance matrix in an analog fashion to the BS. For eigenvector feedback, the MS obtains a covariance matrix similar to that of covariance feedback but then computes the dominant eigenvector or eigenvectors of the covariance matrix and feeds back the eigenvector or eigenvectors in an analog fashion to the BS.

Yet another methodology for enabling closed-loop transmission is to quantize the elements of the covariance matrix by a fixed number of bits with fixed and predefined amplitude and phase range. Specifically the quantization function that maps an unquantized value or a set of values to a quantized value or a set of values is predefined and fixed for a given size of the covariance matrix. In addition the quantization of one element of the covariance matrix or a set of elements of the covariance matrix does not depend on the quantization of the elements outside the set. Then the MS feeds back the fixed number of bits and the BS is able to get a one-time estimate of the covariance matrix which tends to have fairly high quantization error.

While the above-techniques may provide an efficient method for channel feedback, the techniques are not robust enough to handle poor channel conditions on the feedback channel (i.e., high feedback error) nor does the quality of the covariance matrix improve in time because the methods are single-shot. Hence a method is needed to improve the quality of the feedback in time plus have resistance to feedback errors.

Figure 1:
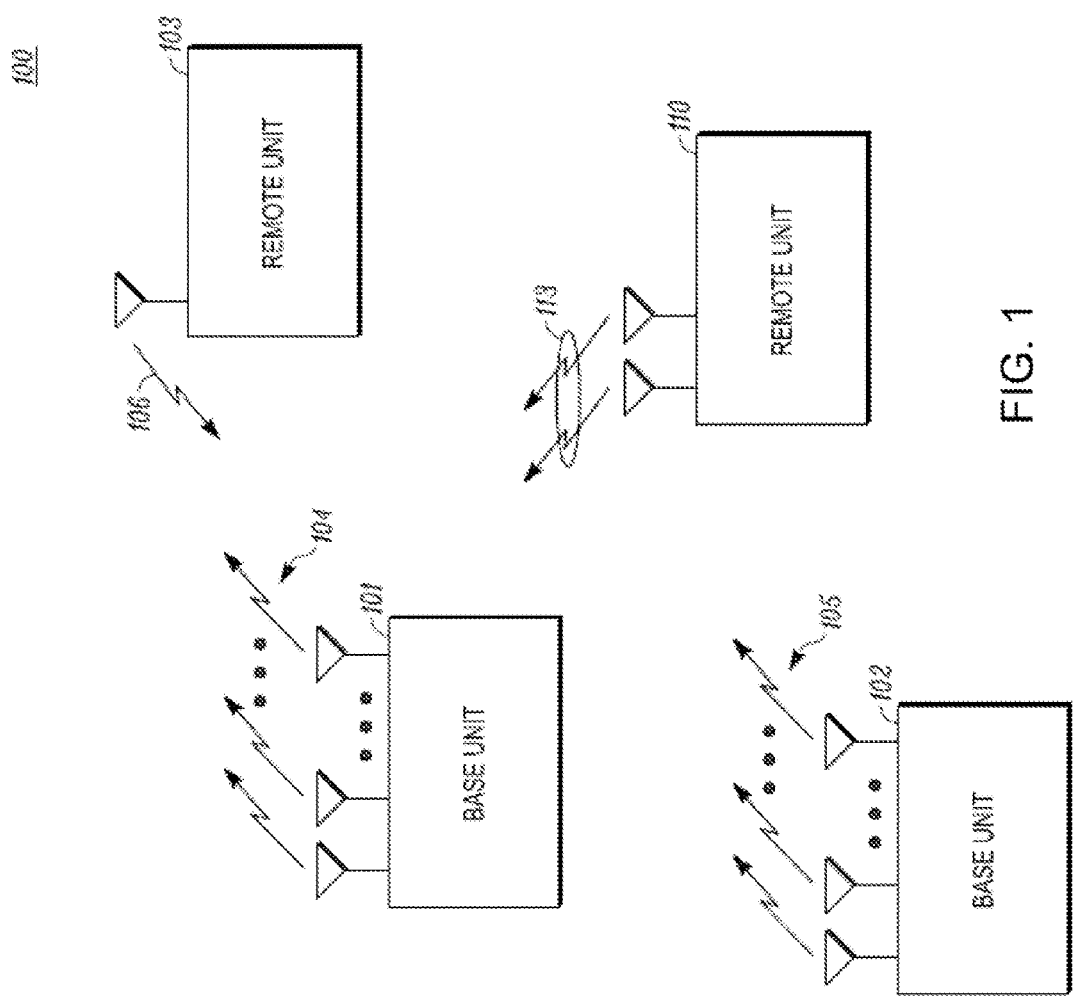
FIG. 1 is a wireless communication system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In order to address the above-mentioned issues, a method and apparatus for providing channel feedback is provided herein. During operation a covariance matrix at time t (R) is calculated as a function of a received downlink signal. Matrix $C^t$ is also calculated and is based on a previous quantized covariance matrix ($R_q^{t-1}$), the covariance matrix (R) at time t, and a forgetting factor ($\gamma$) that is applied to $R_q^{t-1}$. The $C^t$ is then used to create a DERC feedback message (signal or waveform) and may be transmitted with pilots on a proper feedback channel to a base unit. The base unit receives the feedback ($C^t$) as a DERC waveform on a proper feedback channel. The base unit uses non-coherent or coherent detection to detect the DERC values send by the remote unit and uses the DERC values with a previous quantized covariance matrix estimate, a forgetting factor, and a weighting value to compute a covariance matrix estimate to use for beamforming. More specifically, the base unit calculates a quantized covariance matrix at time t ($R_q^t$) based on a previous quantized covariance matrix at time t−1 ($R_q^{t-1}$) and a forgetting factor ($\gamma$) that is applied to $R_q^{t-1}$. The base unit then uses the covariance matrix estimate to determine appropriate channel beamforming weights, and instructs transmit beamforming circuitry to use the appropriate weights.

By applying a forgetting factor to the previous covariance matrix estimates in addition to differential feedback on the entries of the covariance matrix, the above-technique is very resistant to feedback errors while providing a high level of accuracy in the covariance matrix fed back to the base.

In FIG. 1, the wireless communication system 100 includes one or more fixed base infrastructure units forming a network distributed over a geographical region. The base unit may also be referred to as an access point, access terminal, BS, Node-B, eNode-B, or by other terminology used in the art. In FIG. 1, the one or more base units 101 and 102 serve a number of remote units 103 and 110 within a serving area, for example, a cell, or within a cell sector. In some systems, one or more base units are communicably coupled to a controller forming an access network that is communicably coupled to one or more core networks. The disclosure however is not intended to be limited to any particular wireless communication system.

Generally, the serving base units 101 and 102 transmit downlink communication signals 104 and 105 to remote units in the time and/or frequency domain. Remote units 103 and 110 communicate with one or more base units 101 and 102 via uplink communication signals 106 and 113. The one or more base units may comprise one or more transmitters and one or more receivers that serve the remote units. The remote units may be fixed or mobile user terminals. The remote units may also be referred to as subscriber units, mobile stations (MSs), users, terminals, subscriber stations, user equipment (UE), user terminals, or by other terminology used in the art. The remote units may also comprise one or more transmitters and one or more receivers. The remote units may have half duplex (HD) or full duplex (FD) transceivers. Half-duplex transceivers do not transmit and receive simultaneously whereas full duplex terminals do.

In the preferred embodiment, the communication system utilizes orthogonal frequency division multiple access (OFDMA) or a multi-carrier based architecture on the downlink and for uplink transmissions. Exemplary OFDMA based protocols include the Long Term Evolution (LTE) of the 3GPP UMTS standard and IEEE 802.16 standard. Although the preferred embodiment utilized OFDMA, other modulation methods may also be employed such as interleaved frequency-division multiple access (IFDMA), DFT spread OFDM, multi-carrier code-division multiple access (MC-CDMA), multi-carrier direct sequence CDMA (MC-DS-CDMA), Orthogonal Frequency and Code Division Multiplexing (OFCDM), or cyclic-prefix single carrier.

Figure 2:
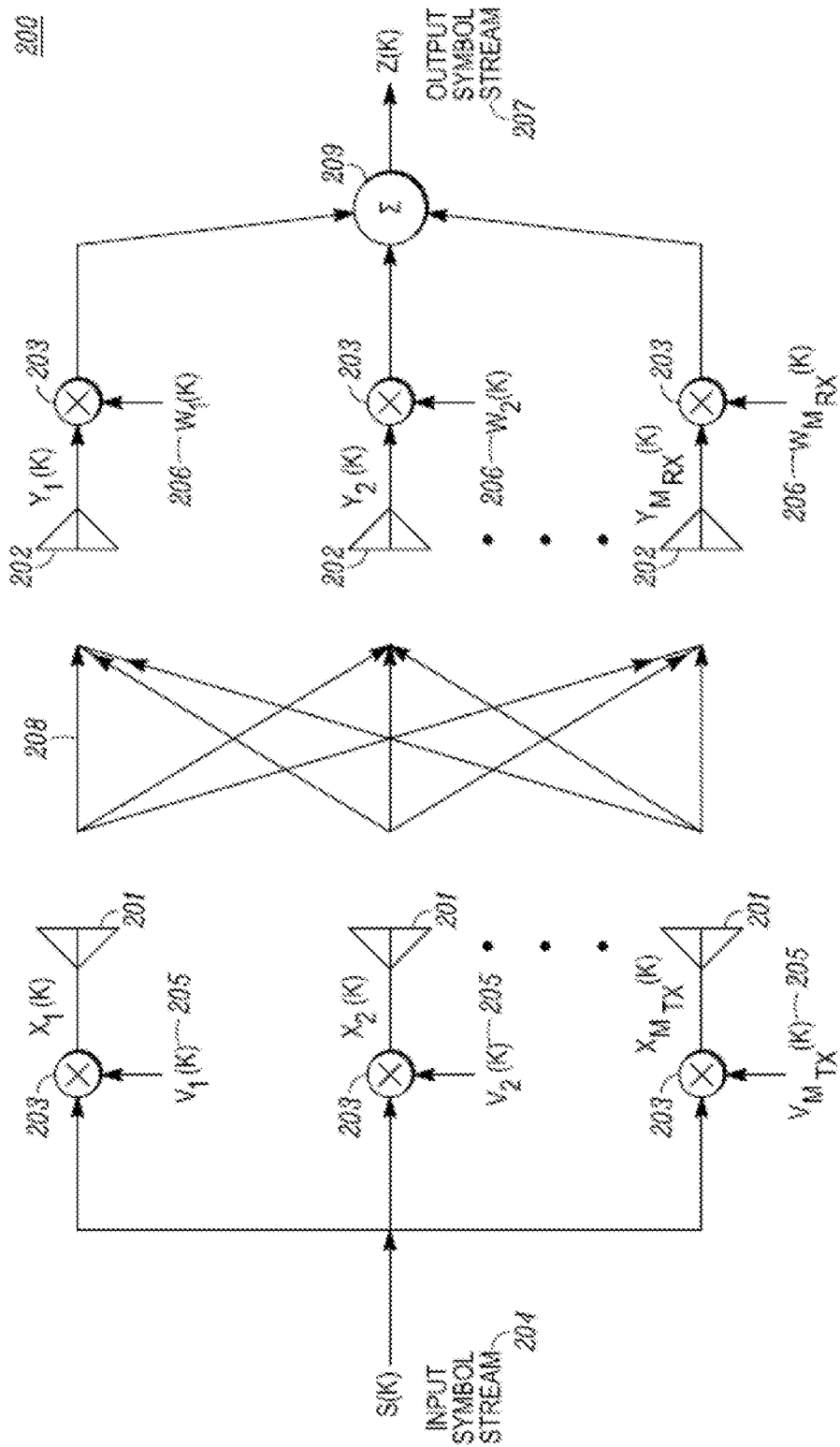
FIG. 2 is a block diagram of a closed-loop transmit antenna array communicating a single data stream to a receiving device.

FIG. 2 is a block diagram of a closed-loop transmit antenna array as part of a base unit communicating a single data stream to a receiving device as part of a remote unit having one or more receive antennas. Input stream 204 is multiplied by transmit weights 205 using multipliers 203 before being fed to the multiple transmit antennas 201. Multiplying input stream 204 by transmit weights 205, where the transmit weights are based on at least a partial channel response, is an example of tailoring a spatial characteristic of the transmission. The transmit weights can be calculated from fed-back information such as the covariance matrix or eigenvectors using a method known in the art. The signals transmitted from the multiple transmit antennas 201 propagate through a matrix channel 208 and are received by multiple receive antennas 202. The signals received on the multiple receive antennas 202 are multiplied by receive weights 206 using multipliers 203 and summed by a summation device 209 to produce an output symbol stream 207. In embodiments where the transmitter has only a single antenna, the spatial characteristic of the transmit signal cannot be tailored. However, other characteristics of the transmit signal may be tailored based on at least a partial channel response, such as the complex gain of each sub-carrier (e.g., in a pre-equalization application), or the modulation and coding used on the sub-carriers of the transmit signal.

Figure 3:
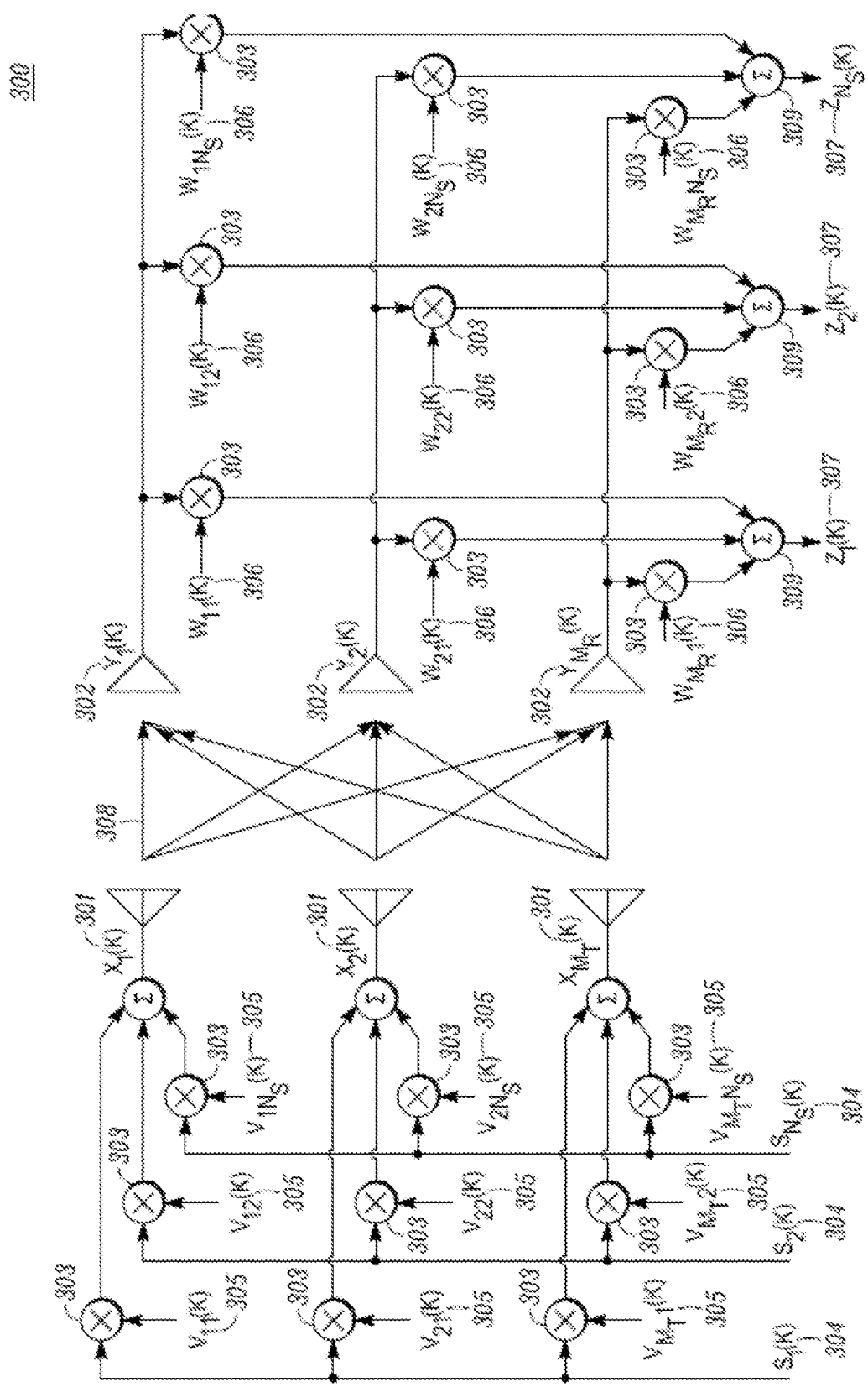
FIG. 3 is a block diagram of a closed-loop transmit antenna array communicating multiple data streams to a receiving device.

FIG. 3 is a block diagram of a closed-loop transmit antenna array as part of a base unit communicating multiple data streams to a remote unit having one or more receive antennas, for example, a MIMO system. Multiple input streams 304 are multiplied by transmit weights 305 using multipliers 303 before being fed to the multiple transmit antennas 301. The signals transmitted from the multiple transmit antennas 301 propagate through a matrix channel 308 and are received by multiple receive antennas 302. The signals received on the multiple receive antennas 302 are multiplied by receive weights 306 using multipliers 303 and summed by summation devices 309 to produce the multiple output symbol streams 307. Multiplying input streams 304 by transmit weights 305 where the transmit weights are based on at least a partial channel response is another example of tailoring a spatial characteristic of the transmission. Other schemes for producing the output symbol streams 307 are possible, such as maximum likelihood detection or successive cancellation that may or may not use the receive weights 306 and the multipliers 303.

Figure 4:
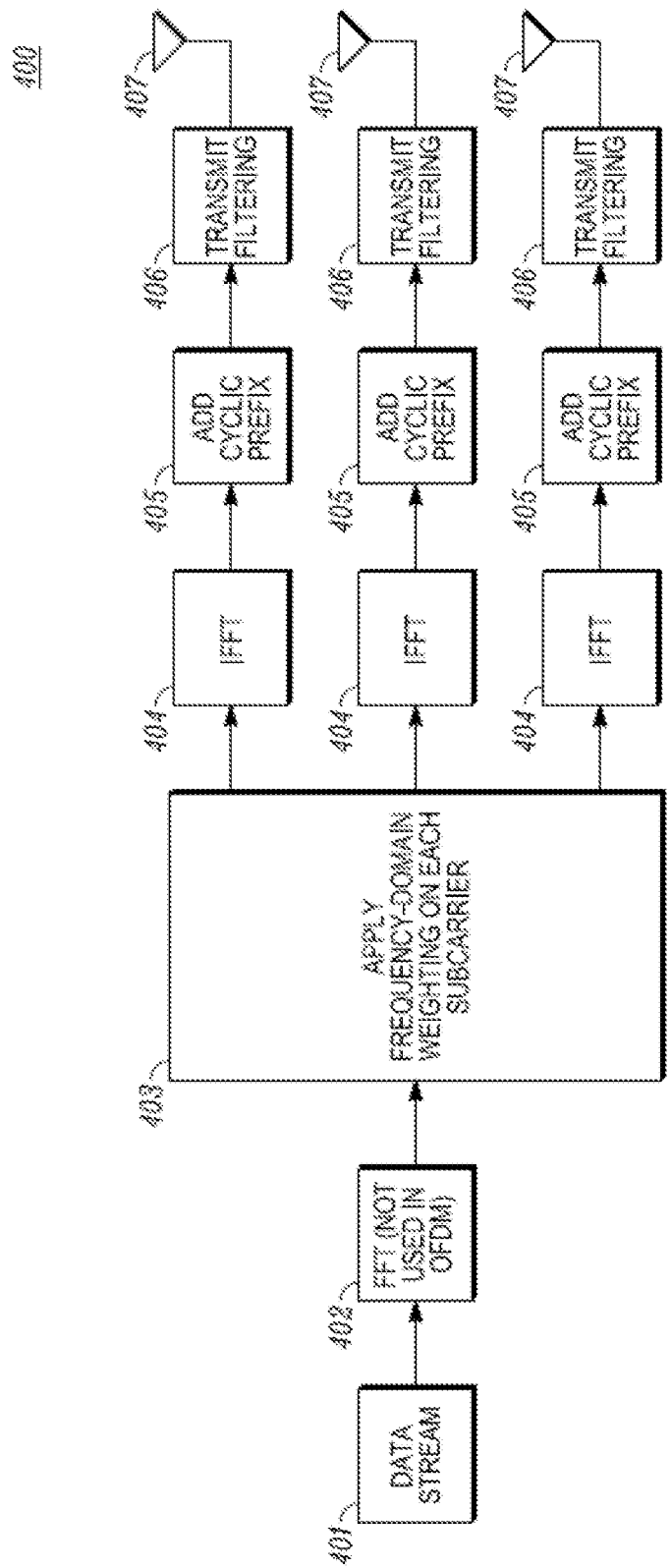
FIG. 4 is a block diagram of a frequency domain-oriented broadband transmission system employing a closed-loop transmit antenna array.

FIG. 4 is a block diagram of a frequency-domain oriented transmission system such as OFDM or cyclic prefix single carrier (CP-Single Carrier) in which the transmission techniques of FIG. 2 and FIG. 3 are performed in the frequency domain prior to transmission. In a CP-Single Carrier system, one or more data streams 401 are first brought into the frequency domain with one or more fast Fourier transforms (FFTs) 402 and the frequency domain data streams are weighted with frequency domain weighting apparatus 403. In OFDM, the one or more data streams 401 are sent directly to frequency domain weighting apparatus 403 without the use of FFT 402. The frequency domain weighting apparatus 403 implements the weighting function shown in the transmit portion of FIG. 2 and FIG. 3 on each sub-carrier or frequency bin in the frequency domain. Thus, the transmit signal can be tailored either spatially, or in frequency, or both with this type of a system. The outputs of the frequency domain weighting apparatus 403 are then brought back into the time domain with IFFTs 404. Cyclic prefixes are added 405 as is known in the art. Transmit filtering 406 is then performed before sending the transmitted signals to the transmit antennas 407.

A more detailed explanation of the differential-error-resistant covariance (DERC) feedback method is now provided. A spatial covariance matrix or more generally 'spatial transmit covariance matrix' captures the correlations between various transmit antennas as experienced in a certain propagation environment. It also captures the received power at the terminal corresponding to each transmit antenna. An instantaneous covariance matrix can be defined for each data subcarrier i, based on the downlink channel estimates available at a time instant (hence can also be referred to as short-term covariance matrix)

$$R_i = H_i^H H_i \quad (1.1)$$

where $H_i$ is the $N_R \times N_T$ channel matrix estimated by the terminal on the downlink where $N_R$ is the number of receive antennas and $N_T$ is the number of transmit antennas. A remote unit can accumulate or average the per-subcarrier instantaneous or short-term covariance matrix over multiple subcarriers. A narrow band covariance matrix is accumulated over subcarriers that encompass a small portion of the operational bandwidth (sometimes referred to as "sub-band"). A wideband or broadband covariance matrix is accumulated over the entire band or a large portion of the band. A remote unit can also accumulate an instantaneous covariance matrix over time to obtain a long-term statistical spatial covariance matrix. In another form, a remote unit may compute the above estimate by including only the rows in the channel matrix corresponding to a subset of the receive antennas on which measurements are available. Also note that a remote unit may obtain the covariance matrix without having to estimate the channel explicitly, for example, by correlating the received pilots sent from each transmit antenna. In an alternate embodiment, the spatial covariance matrix may be replaced by an (any) Hermitian matrix. The coefficients of the Hermitian matrix may be analog (meaning not quantized and coded or modulated with a digital modulation technique e.g. QPSK, QAM) and may or may not be a direct function of the spatial covariance matrix. Examples of such matrices include $\sigma^2 I$, $R + \sigma^2 I$ where I is an $N_T \times N_T$ identity matrix, $\sigma^2$ is a real scalar and R is an $N_T \times N_T$ spatial covariance matrix.

As suggested above, the base unit uses a fed-back spatial covariance matrix or matrices to compute transmit weights and for other purposes as will become more fully apparent from the discussion herein. In one embodiment, the remote unit computes the spatial covariance matrix based on a measured downlink matrix channel response. The computation of spatial covariance matrices is known generally by those having ordinary skill in the art. The present disclosure is not intended to be limited to any particular method or technique of computing a spatial covariance matrix. In some implementations, the base unit indicates which portion of the operational bandwidth for which the one or more spatial covariance matrices should be computed by the remote unit. This indication could be explicit or implied.

In one implementation, the remote unit computes one or more spatial covariance matrices and transmits a representation thereof to the base unit using multiple time intervals. In one embodiment, the base unit uses the spatial covariance matrix or matrices received from the remote unit to compute beamforming weights (i.e., complex-valued weighting factors for each transmit antenna). In one embodiment, a base unit may use the covariance matrix accumulated over the entire band (or dominant eigenvector(s) computed from the covariance matrix accumulated over the entire band) for computing the beamforming weights that will then be the same on all subcarriers. In another embodiment, a base unit may use the covariance matrix specific to a portion of the band (or the dominant eigenvector(s) computed from the covariance matrix specific to a portion of the band) for beamforming only in the corresponding portion of the band. In one embodiment, the base unit may request periodic feedback of the covariance matrix corresponding to a portion of the band or its entirety or both. In another embodiment, the base unit commands the remote unit to compute and feedback the covariance matrix or matrices on an as-needed basis or on a periodic basis. The identity of the bands corresponding to a covariance matrix that is fed back may be indicated by the eNodeB, determined by the MS or configured by higher-layer signaling.

In another embodiment, the base unit uses a covariance matrix or matrices that is (are) fed back from the remote unit to compute multiple transmit weight vectors for use in multi-stream beamforming or closed-loop MIMO applications where multiple spatial channels are simultaneously formed (one formed by each transmit weight vector) so as to realize a spatial multiplexing gain on the time-frequency resources used for transmission to the mobile unit. The remote unit receiving transmission may or may not be served by the base-unit. A serving base unit for a particular remote unit is defined as one that transmits primary control information to the remote unit. When the remote unit is not served by the base-unit, the transmission may be referred to as a coordinated multi-point (COMP) transmission.

In another embodiment, the base unit uses the covariance matrices fed back from multiple remote units to compute multiple transmit weight vectors for the purpose of realizing multi-user MIMO transmission (also called transmit Spatial Division Multiple Access (SDMA)) to multiple remote units simultaneously on the same time-frequency resources. One or more of the remote units receiving transmission may not be served by the base-unit. When the remote unit is not served by the base-unit, the transmission may be referred as a coordinated multi-point (COMP) transmission.

In another implementation, the remote unit computes multiple spatial covariance matrices for the set of multiple covariance matrices that correspond to different portions of the operational band, and transmits the matrices to the base unit per the allocation by the base unit. In one embodiment, the base unit uses the spatial covariance matrices received from the remote unit to compute transmit weights for frequency selective scheduling (FSS) applications. The group of subcarriers (frequency band) that are used to derive spatial covariance matrices can be chosen by a remote unit or by a base unit. The time gap from one feedback of this information to the next feedback can be decided by a remote unit or by a base unit based on factors such as remote unit moving speed, SNR, etc.

In another implementation a BS may send or receive a covariance matrix (fed back by a MS) from another BS through an in-band or out-of-band backhaul link. A BS may determine transmit weights for one or more served MSs using multiple covariance matrices received in this fashion from other BSs.

A covariance matrix feedback is obtained by summing the per-subcarrier covariance matrix defined in (1.1) over all the subcarriers in the entire band or a subset of subcarriers associated with a sub-band (or allocation), whose index can be denoted as j in the mathematical expressions below. Such association of a spatial covariance matrix to the entire or sub-band may be explicitly or implicitly signaled by the base unit.

The spatial covariance matrix accumulated over subcarriers that belong to the $j^{th}$ sub-band can be written as $$R = \sum_{i \in B_j} H_i^H H_i \quad (1.2)$$

where $B_j$ is the set of subcarriers associated with the band or allocation index. The matrix R is a $N_T \times N_T$ matrix which can be represented as below $$R = \begin{bmatrix} R_{1,1} & R_{1,2} & \cdots & R_{1,N_T} \\ R_{2,1} & R_{2,2} & & R_{2,N_T} \\ \vdots & & \ddots & \\ R_{N_T,1} & R_{N_T,2} & & R_{N_T,N_T} \end{bmatrix} \quad (1.3)$$

with $N_T^2$ entries where $N_T$ denotes the number of transmit antennas.

The covariance matrix may be normalized and quantized before feedback as $$R_q = Q(R/\text{trace}(R)) \quad (1.4)$$

Where Q( ) is the quantization function and some example quantization methods are described below. The normalization need not be done with the same covariance matrix which is being fed back. For example in CoMP operation it may be preferable to have a relative power weighting between two or more different covariance matrices to assist in designing transmit weights. For this case the normalization may be done via $$R_q = Q(R/\text{trace}(R_d)) \quad (1.5)$$

where $R_d$ is the covariance matrix used to normalize all covariance matrices (i.e., $R_d$ is the covariance matrix of the desired or serving cell).

Note that the covariance matrix has some structure that can be exploited by the quantization methods described below. For example, the main diagonal has all positive real elements and hence no imaginary or phase information is needed. Also the matrix is hermitian symmetric meaning that $R_{i,j} = R^*_{j,i}$ where $R_{i,j}$ s element i,j of R. Thus only the upper (or lower) part of R needs to be fed back and the other entries can be derived.

In the preferred embodiment of the DERC feedback method the real and imaginary parts of the covariance matrix are updated at each time by a single bit indicating to move up or down by a delta value (although presented as just a single bit, multi-level feedback can also be employed). This method is particularly useful when the covariance matrix does not change too rapidly in time like when wideband feedback is used or for low-speed operation. The basic idea is to update the quantized covariance matrix at time t by $$R_q^t = \gamma R_q^{t-1} + C^t \quad (1.6)$$

where $\gamma$ is a forgetting factor put on the previous quantized matrix (e.g., $\gamma = 0.98$) and $C^t$ is the differential update at time t (i.e., $C^t$ is the DERC feedback values or DERC values at time t). The elements of $C^t$ are updated using the current covariance matrix estimate, R, along with the previous quantized covariance matrix as follows for the main diagonal elements (where $(A)_{n,m}$ means element n,m of matrix A)

$$\{C^t\}_{nn} = \alpha \text{sgn}((R)_{nn} - \text{Re}(\gamma\{R_q^{t-1}\}_{nn})) \quad (1.7)$$

and as follows for the off-diagonal elements (m>n)

$$\{C^t\}_{nm} = \alpha \text{sgn}(\text{Re}((R)_{nm}) - \text{Re}(\gamma\{R_q^{t-1}\}_{nm})) + j\alpha \text{sgn}(\text{Im}((R)_{nm}) - \text{Im}(\gamma\{R_q^{t-1}\}_{nm})). \quad (1.8)$$

where Re(x) is the real part of x and Im(x) is the imaginary part of x. Thus, $C^t$ is based on a difference between the current value of R and a previous value of the quantized covariance matrix $R_q^{t-1}$.

Note that feedback of the off-diagonal elements only needs to be done for the upper diagonal (m>n) since R is a hermitian matrix (i.e., $(R)_{nm} = (R^*)_{mn}$). An example of a reasonable value for $\alpha$ is 0.005.

Although the main diagonal and off-diagonal elements all have the same scaling factor (also referred to as weighting factor) $\alpha$, this need not be the case. It is possible that the off diagonal elements could have a lower scaling factor than the main diagonal elements. Also it is possible to send the feedback for the main diagonal elements at a different rate (either higher or lower) than the off-diagonal elements.

To speed the convergence $\alpha$ can be increased during the first few iterations. For example first initialize the algorithm with some fixed-bit quantization and then using $4\alpha$ during the first 8 iterations and $2\alpha$ for the subsequent 4 iterations.

For four transmit antennas the differential method requires 16 bits of feedback and for eight transmit antennas it requires 64 bits of feedback. One easy method to drop the amount of feedback (at the price of convergence) is to only feedback a portion of the entries at each time instead of all entries each time. Another option is to only send feedback for a group of entries that decreases the error to R. For example, say in the four antenna case the entries are broken up into four groups as follows $$\begin{bmatrix} 1 & 2 & 3 & 4 \\ - & 1 & 2 & 4 \\ - & - & 1 & 3 \\ - & - & - & 1 \end{bmatrix} \quad (1.9)$$

Note that each group has four bits (the main diagonal entries are all real so only require one bit, the off-diagonal entries require two bits each because they are complex). Then the mobile would send back 2 bits to indicate which one of the four groups it is feeding back differential information for along with 4 bits for the differential feedback. So only a total of 6 bits needs to be fed back instead of the 16 bits required for feeding back differential information all entries. In this method only the entries that decrease the error to R the most are updated and the others remain unchanged.

It can be shown that the DERC method has the following form at time t $$R_q^t = \gamma^t R_q^0 + \sum_{n=1}^{t} \gamma^{n-1} C^{t+1-n} \quad (1.10)$$

where $R_q^0$ is the matrix that initialized the algorithm (e.g., use the fixed bit method). This form is what gives this differential method its error protection since most of the summation is with correct information (unless the bit error rate approaches 50%) and there is a forgetting factor applied to past errors.

Another form of the differential method uses a rank two update using codebook feedback. In this form, $C^t$ is updated as $$C^t = \alpha_1 v_1 v_1^H + \alpha_2 v_2 v_2^H \quad (1.11)$$

where $v_1$ and $v_2$ are chosen as vector from a codebook. $C^t$ is chosen to minimize $$|R - (\gamma R_q^{t-1} + C^t)|^2 \quad (1.12)$$

The covariance matrix at time t is given as $$R_q^t = \gamma R_q^{t-1} + C^t \quad (1.13)$$

One way of determining $v_1$ and $v_2$ is as follows:
First determine $v_1$ as the argument that maximizes $$|v^H R v| \quad (1.14)$$

where v is chosen as vector from a codebook of vectors, V. Then determine $\alpha_1 = \alpha \text{sgn}(v_1^H R v_1)$ where sgn(x) is +1 if x≧0 and is −1 if x<0 and $\alpha$ is a predefined scaling (or weighting) value as mentioned above. Next determine $R' = R - \alpha_1 v_1^H R v_1$ and determine $v_2$ as the argument that maximizes $|v^H R' v|$ where v is chosen as vector from a codebook of vectors, V. Then determine $\alpha_2 = \alpha \text{sgn}(v_2^H R' v_2)$.

Another manner of determining $v_1$, $v_2$, $\alpha_1$, and $\alpha_2$ for the rank-two feedback version of DERC is as follows. Initialize with an estimate of the covariance matrix, R, plus set $\tilde{R}=R$ and set Q equal to a $N_T \times N_T$ matrix of all zeros. Then the feedback is determined as follows:

1) choose $v_1$ as the argument that maximizes $|v^H \tilde{R} v|$
2) choose $\alpha_1 = \alpha \text{sgn}(v_1^H \tilde{R} v_1)$
3) update $\tilde{R} = \tilde{R} - \alpha_1 v_1 v_1^H$
4) choose $v_2$ as the argument that maximizes $|v^H \tilde{R} v|$
5) choose $\alpha_2 = \alpha \text{sgn}(v_2^H \tilde{R} v_2)$
6) update $\tilde{R} = \tilde{R} - \alpha_2 v_2 v_2^H$
7) update $Q = \beta Q + \alpha_1 v_1 v_1^H + \alpha_2 v_2 v_2^H$
8) set $R_{old} = R$
9) at next feedback interval, update R
10) set $\tilde{R} = \tilde{R} + (R - R_{old}) + (1-\beta)Q$ to step 1

In an alternate embodiment of the DERC feedback method the real and imaginary parts of the one or more dominant eigenvectors of the covariance matrix are updated at each time by a single bit indicating to move up or down by a delta value. This method may have less feedback than the covariance-based feedback depending on the number of transmit antennas and the number of dominant eigenvectors than need to be fed back. The basic idea is to update each of the $N_d$ dominant eigenvectors ($e_1$ through $e_{N_d}$) or R at time t by $$v_{n,q}^t = \gamma v_{n,q}^{t-1} + c_n^t \quad (1.15)$$

where $\gamma$ is a forgetting factor put on the previous quantized vector (e.g., $\gamma=0.98$) and $c_n^t$ is the differential update for eigenvector n at time t (i.e., $e_n$ is the DERC feedback values or DERC values at time t). To reduce feedback one of the elements of $e_n$ and $v_{n,q}$ can be all real and without loss of generality the first element of $e_n$ and $v_{n,q}$ is assumed to be all real (although in other embodiments other elements of $e_n$ and $v_{n,q}$ may be real valued and each of the $N_d$ different vectors may have the same or different elements which are real valued). The elements of $e_n$ are updated using the $N_d$ dominant eigenvectors ($e_1$ through $e_{N_d}$) of the current covariance matrix estimate, R, along with the previous quantized covariance matrix as follows for the first element of $v_{n,q}$ (or the element that is real-valued):

$$\{c_n^t\}_1 = \alpha \text{sgn}((e_n)_1 - Re(\gamma\{v_{n,q}^{t-1}\}_1)) \quad (1.16)$$

and as follows for the remaining elements (e.g., m>2)

$$\{c_n^t\}_m = \alpha \text{sgn}(Re(e_n)_m - Re(\gamma\{v_{n,q}^{t-1}\}_m)) + j\alpha \text{sgn}(Im(e_n)_m - Im(\gamma\{v_{n,q}^{t-1}\}_m)). \quad (1.17)$$

where $(a)_n$ is the $n^{th}$ element of the vector a.

To capture the power difference between the different eigenmodes, the eigenvectors may be scaled before quantizing. For example assume the eigenvalues ($\delta_1$ through $\delta_{N_d}$) and eigenvectors of R are ordered so that $\delta_1 \geq \delta_2 \geq \ldots \geq \delta_{N_d}$. Then assume $|e_1|^2 = 1$ and the remaining eigenvectors can be normalized so that $$|e_n|^2 = \delta_m / \delta_1 \quad (1.18)$$

Besides just the methods for determining the feedback, a mechanism is needed for the base to request the feedback and a feedback channel is needed for the mobile to send the feedback. The base can request the feedback and in addition parameters (e.g. $\gamma$) for controlling the quantization by using a downlink control message or higher layer signaling. Then the mobile in response to the feedback request message will determine the covariance matrix from downlink pilots and will compute feedback using one of the above methods. The mobile will then feed back the information to the base which will then undo the encoding to determine the covariance matrix estimate. In addition the mobile may feedback information to the base station (e.g. $\gamma$) needed to control the parameters required for forming a covariance matrix estimate.

A feedback request message need not be sent every time the mobile sends feedback, but instead the feedback can be sent in a persistent fashion until indicated to stop by the base. The persistent feedback is a good mode of operation for the differential method since additional differential feedback improves the covariance method.

Figure 5:
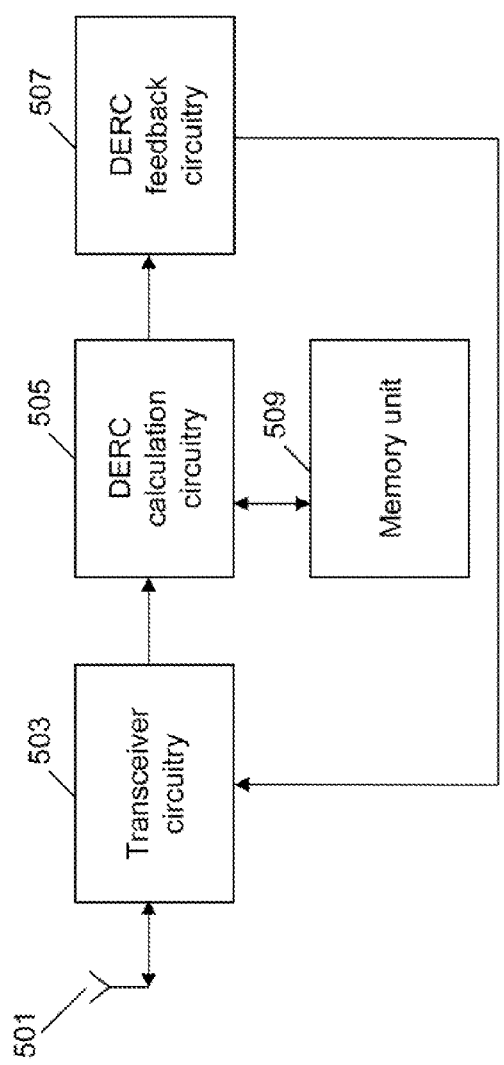
FIG. 5 is a block diagram of a remote unit using the differential-error-resistant covariance (DERC) feedback method.

FIG. 5 is a block diagram of a remote unit using uplink feedback channel. Transceiver circuitry 503 receives a DERC feedback request signal from a base unit on an antenna or an array of antennas 501 along with downlink pilot symbols. The downlink pilot symbols may or may not be transmitted from the serving base station. In response to the DERC feedback request, the mobile unit calculates a covariance matrix (R) at time t as a function of the received downlink pilot symbols in the DERC calculation circuitry 505. This covariance matrix may be averaged together, with a previous estimate obtained from the memory unit 509. The DERC calculation circuitry 505 then computes the DERC feedback values ($C^t$) from the covariance matrix plus the previously quantized covariance matrix obtained from the memory unit 509 utilizing the forgetting factor and weighting value as described above. As discussed above, $C^t$ is based on a previous quantized covariance matrix ($R_q^{t-1}$), the covariance matrix (R) at time t, and a forgetting factor ($\gamma$) that is applied to $R_q^{t-1}$.

As shown in FIG. 5, DERC feedback circuitry 507 is provided to create the specific DERC feedback waveforms from the DERC feedback generated by the DERC feedback calculation circuitry 505. Once the DERC feedback waveform is created by the DERC feedback circuitry 507, then the DERC feedback waveform is sent to the base unit via the transceiver circuitry 503. The operation of sending the DERC feedback may be repeated two or more times to provide additional DERC feedback.

Figure 6:
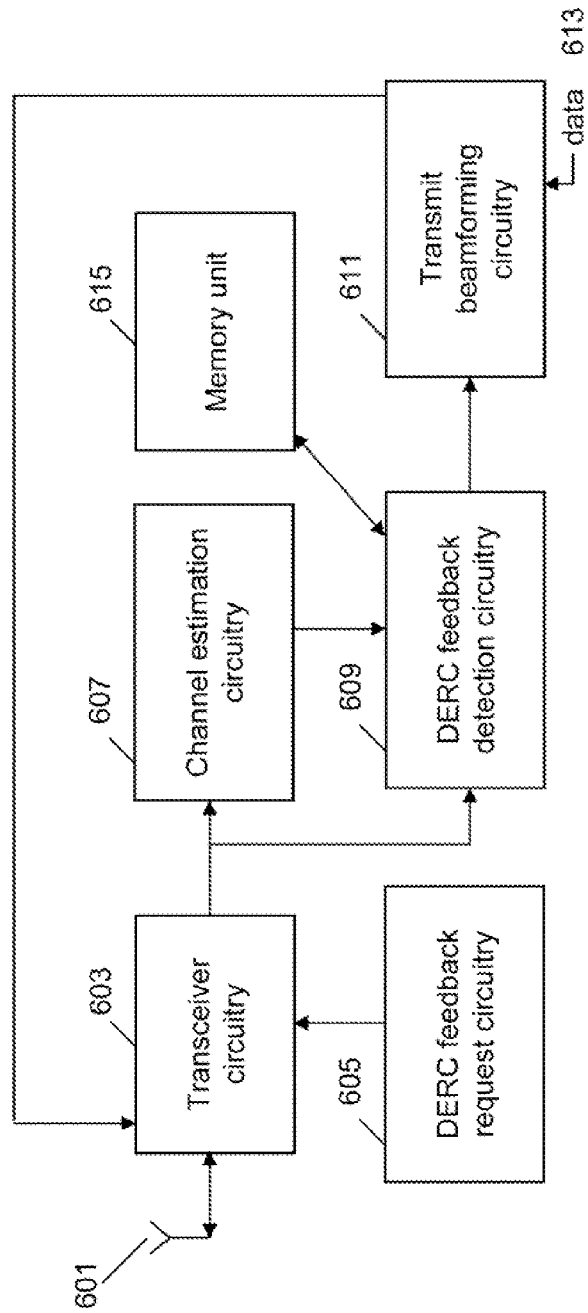
FIG. 6 is a block diagram for a base unit requesting DERC feedback subchannel and receiving DERC feedback from a remote unit.

FIG. 6 is a block diagram of a base unit employing DERC feedback. The base unit first determines that a mobile unit should send DERC feedback along with what frequencies the feedback should be for. This information is sent in a DERC feedback request signal generated by DERC feedback request circuitry 605. The DERC feedback request signal is provided to the transceiver circuitry 603 which sends the signal to the remote unit over an antenna or an array of antennas 601.

In addition to the DERC feedback request signal, pilot symbols might also be sent out of each of the transmit antennas by the transceiver circuitry 603. In response to the DERC feedback request sent to the remote unit, transceiver circuitry 603 will receive a DERC feedback signal ($C^t$) from the mobile unit. The transceiver circuitry 603 will send the received DERC feedback signal to the DERC feedback detection circuitry 609 and may optionally send the received DERC feedback signal to channel estimation circuitry 607 if coherent detection is used on the feedback channel. Channel estimation circuitry 607 will use the pilot symbols optionally contained in the DERC feedback signal to obtain channel estimates. If coherent demodulation is used, these channel estimates are provided to the DERC feedback detection circuitry 609 to equalize the data portion of the DERC feedback signal which contains the differential covariance feedback from the mobile and ultimately compute a covariance matrix estimate utilizing the previous quantized covariance matrix estimate obtained from memory unit 615 along with the weighting value and forgetting factor. In other words, a quantized covariance matrix is calculated at time t ($R_q$) based on a previous quantized covariance matrix at time t−1 ($R_q^{t-1}$) and a forgetting factor ($\gamma$) that is applied to $R_q^{t-1}$.

If non-coherent demodulation is used, the DER feedback detection circuitry 609 estimates the covariance matrix directly from the DERC feedback signal plus the previous quantized covariance matrix estimate obtained from memory unit 615 along with the forgetting factor and weighting value. In other words, a quantized covariance matrix is calculated at time t ($R_q^t$) based on a previous quantized covariance matrix at time t−1 ($R_q^{t-1}$) and a forgetting factor ($\gamma$) that is applied to $R_q^{t-1}$. The estimated covariance matrix is then provided to transmit beamforming circuitry 611 that uses the DERC feedback to beamform data 613 that is to be sent to the remote unit from the transceiver circuitry 603.

Figures 7, 8:
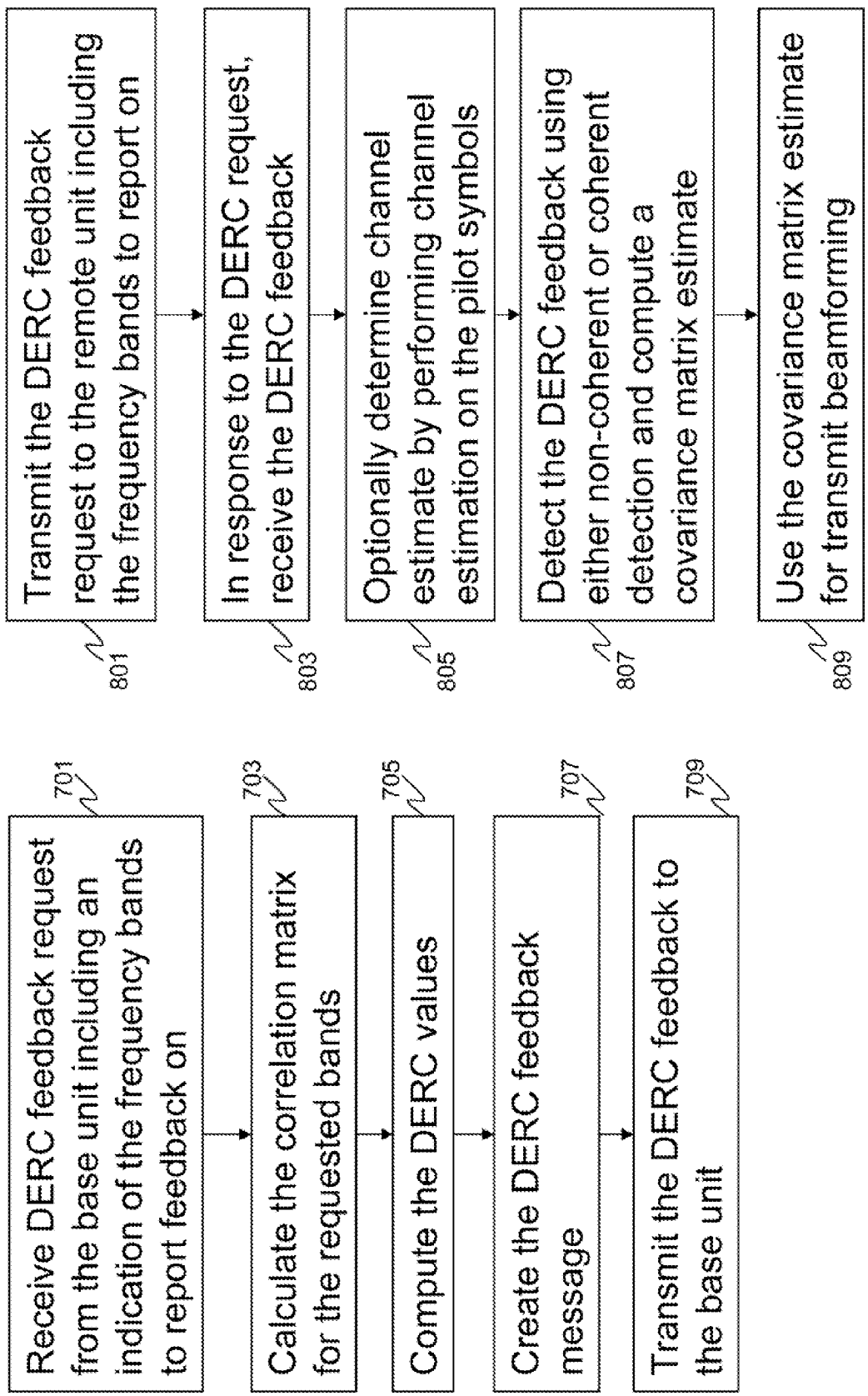
FIG. 7 is a flow chart showing operation of the DERC feedback process at a remote unit.
FIG. 8 is a flow chart showing operation of requesting and receiving DERC feedback at a base unit.

FIG. 7 is a flow chart showing operation of the mobile unit creating a DERC feedback waveform (signal or message). The logic flow begins at step 701 where transceiver circuitry 503 receives a request to supply a feedback of channel information. As discussed above, the request is received from a base station and may also contain the frequency bands to report feedback on. At step 703 DERC feedback calculation circuitry 505 calculates a covariance matrix at time t (R) as a function of a received downlink signal; and then calculates matrix $C^t$ to feed back to the base station. $C^t$ is based on a previous quantized covariance matrix ($R_q^{t-1}$), the covariance matrix (R) at time t, and a forgetting factor ($\gamma$) that is applied to $R_q^{t-1}$. The DERC values ($C^t$) are then used to create a DERC feedback message (signal or waveform) by DERC feedback circuitry 507 and may be transmitted with pilots on a proper feedback channel to a base unit (step 709).

FIG. 8 is a flow chart showing operation of requesting and receiving DERC feedback at a base unit when the base unit determines that channel information is needed regarding a channel existing between the base unit and a mobile station. The logic flow begins at step 801 where transceiver 603 transmits a DERC feedback request to a remote unit where the DERC feedback request includes a frequency band to report on. At step 803, and in response to the request, transceiver 603 receives the feedback ($C^t$) as a DERC waveform on a proper feedback channel. Optionally (if coherent detection of the DERC waveform is used) channel estimation circuitry 607 determines channel estimates from the pilots optionally contained in the feedback channel (step 805). Additionally, DERC feedback detection circuitry 609 uses non-coherent or coherent detection to detect the DERC values send by the remote unit and uses the DERC values with a previous quantized covariance matrix estimate, a forgetting factor, and a weighting value to compute a covariance matrix estimate to use for beamforming (step 807). More specifically, circuitry 609 calculates a quantized covariance matrix at time t ($R_q^t$) based on a previous quantized covariance matrix at time t−1 ($R_q^{t-1}$) and a forgetting factor ($\gamma$) that is applied to $R_q^{t-1}$. Finally at step 809, DERC feedback detection circuitry 609 uses the covariance matrix estimate to determine appropriate channel beamforming weights, and instructs transmit beamforming circuitry 611 to use the appropriate weights.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for closed loop feedback in a communication system, the method comprising the steps of:
receiving, by a mobile unit, a request to feed back channel information, the request sent from a base station;
calculating by the mobile unit, a covariance matrix at time t (R) as a function of a received downlink signal;
calculating matrix $C^t$ to feed back to the base station, wherein $C^t$ is based on a previous quantized covariance matrix ($R_q^{t-1}$), the covariance matrix (R) at time t, and a forgetting factor ($\gamma$) that is applied to $R_q^{t-1}$;
transmitting $C^t$ to the base station.

2. The method of claim 1 wherein $C^t$ is based on a difference between the current value of R and a previous value of the quantized covariance matrix $R_q^{t-1}$.

3. The method of claim 2 wherein for main diagonal elements of $C^t$ (where $(A)_{n,m}$ means element n,m of matrix A), $\{C^t\}_{nn} = \alpha \operatorname{sgn}((R)_{nn} - \operatorname{Re}(\gamma\{R_q^{t-1}\}_{nn}))$ where $\alpha$ is a scaling factor and $\operatorname{sgn}(x)$ is +1 if $x \geq 0$ and is −1 if $x < 0$.

4. The method of claim 1 wherein for the off-diagonal elements of $C^t$ (m>n), $\{C^t\}_{nm} = \alpha \text{sgn}(\text{Re}((R)_{nm}) - \text{Re}(\gamma \{R_q^{t-1}\}_{nm})) + j\alpha \text{sgn}(\text{Im}((R)_{nm}) - \text{Im}(\gamma \{R_q^{t-1}\}_{nm}))$ where Re(x) is the real part of x and Im(x) is the imaginary part of x.

5. A method for closed loop feedback in a communication system, the method comprising the steps of:
  transmitting to a mobile unit, a request to feed back channel information;
  receiving matrix $C^t$ from the mobile station in response to the transmitted feedback request;
  calculating a quantized covariance matrix at time t ($R_q^t$) based on a previous quantized covariance matrix at time t−1 ($R_q^{t-1}$) and a forgetting factor (γ) that is applied to $R_q^{t-1}$;
  calculating transmit weights from $R_q^t$.

6. The method of claim 5 wherein $C^t$ is based on a difference between the current value of R and a previous value of the quantized covariance matrix $R_q^{t-1}$.

7. The method of claim 5 wherein for main diagonal elements of $C^t$ (where $(A)_{n,m}$ means element n,m of matrix A), $\{C^t\}_{nn} = \alpha \text{sgn}((R)_{nn} - \text{Re}(\gamma \{R_q^{t-1}\}_{nn}))$ where α is a scaling factor and sgn(x) is +1 if x≧0 and is −1 if x<0.

8. The method of claim 5 wherein for the off-diagonal elements of $C^t$ (m>n), $\{C^t\}_{nm} = \alpha \text{sgn}(\text{Re}((R)_{nm}) - \text{Re}(\gamma \{_q^{t-1}\}_{nm})) + j\alpha \text{sgn}(\text{Im}((R)_{nm}) - \text{Im}(\gamma \{R_q^{t-1}\}_{nm}))$ where Re(x) is the real part of x and Im(x) is the imaginary part of x.

\* \* \* \* \*